United States Patent [19]

Kyo et al.

[11] 4,229,332

[45] Oct. 21, 1980

[54] AROMATIC COPOLYESTER COMPOSITION

[75] Inventors: Kayomon Kyo, Kyoto; Yasuhiko Asai, Uji; Isamu Hirose; Minolu Kishida, both of Kyoto, all of Japan

[73] Assignee: Unitika Ltd., Amagasaki, Japan

[21] Appl. No.: 860,411

[22] Filed: Dec. 13, 1977

[51] Int. Cl.$^2$ ............ C08G 63/46; C08G 63/48; C08G 63/76

[52] U.S. Cl. ............ 260/22 T; 260/22 D; 260/31.2 XA; 260/31.8 XA; 260/45.85 R; 260/45.85 B; 260/45.85 T; 260/45.85 P; 260/45.85 V; 528/128; 528/173; 528/194

[58] Field of Search ....... 260/22 T, 22 D, 31.2 XA, 260/31.8 XA, 45.85 R, 45.85 B, 45.85 T, 45.85 P, 45.85 V; 528/128, 173, 194, 177

[56] References Cited

U.S. PATENT DOCUMENTS

| | | | |
|---|---|---|---|
| 3,575,931 | 4/1971 | Sherman | 260/31.8 XA |
| 3,966,671 | 6/1976 | Smith | 260/31.2 XA |
| 4,115,333 | 9/1978 | Phipps, Jr. et al. | 260/31.8 XA |

*Primary Examiner*—Lester L. Lee
*Attorney, Agent, or Firm*—Sughrue, Rothwell, Mion, Zinn and Macpeak

[57] ABSTRACT

An aromatic copolyester composition comprising (A) an aromatic copolyester derived from terephthalic acid, isophthalic acid and/or a bisphenol and (B) a metal salt of an organic carboxylic acid, which is suitable for preparation of molded articles having superior mechanical properties and fire retardancy as well as superior thermal stability and reduced crazing.

22 Claims, No Drawings

AROMATIC COPOLYESTER COMPOSITION

BACKGROUND OF THE INVENTION

1. BACKGROUND OF THE INVENTION

1. Field of the Invention

This invention relates to an aromatic copolyester composition having improved crazing resistance and thermal stability, and more specifically, to an aromatic copolyester composition containing a metal salt of an organic carboxylic acid and having improved crazing resistance and thermal stability.

2. Description of the Prior Art

Aromatic copolyesters, as used in this invention are obtained from a mixture of terephthalic acid and/or functional derivatives thereof and isophthalic acid and/or functional derivatives thereof (with the terephthalic acid unit/isophthalic acid unit mole ratio being about 9:1 to about 1:9) and a bisphenol of the following general formula (I):

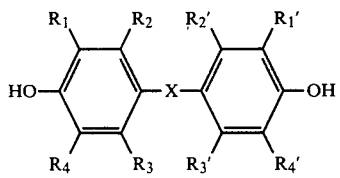

wherein —X— is selected from the group consisting of —O—, —S—, —SO$_2$—, —SO—, —CO—, an alkylene group containing 1 to 4 carbon atoms and an alkylidene group containing 1 to 4 carbon atoms, and $R_1$, $R_2$, $R_3$, $R_4$, $R'_1$, $R'_2$, $R'_3$ and $R'_4$, which may be the same or different, each represents a member selected from the group consisting of a hydrogen atom, a chlorine atom, a bromine atom and an alkyl group containing 1 to 4 carbon atoms, or functional derivatives thereof.

It is well known that such aromatic copolyesters have many superior properties, for example, superior mechanical properties such as tensile strength, bending strength, bending recovery, or impact strength, a high heat distortion temperature, and a high heat decomposition temperature, electrical properties such as inherent resistivity, dielectric breakdown strength, arc resistance or dielectric characteristics, good fire retardancy, good dimensional stability and good solvent resistance. Because of these superior properties, aromatic copolyesters are known to be useful in a wide range of fields as various molded articles, films, fibers and coating materials produced by injection molding, extrusion molding, press molding, and other molding techniques.

Aromatic copolyesters have excellent characteristics and as a result can be used in a wide variety of applications as mentioned above, but unfortunately, crazing develops in products produced from these aromatic copolyesters, especially molded plastics, when they are in contact with air for a long period of time or especially when in contact with hot water or steam. The term "crazing" is used herein to describe the phenomenon whereby molded products become cloudy, partly or completely, when a fine crack-like pattern being generated on the surface or in the interior of the products. "Crazing" reduces not only the transparency of the products, which is one of the characteristics of aromatic copolyesters, but also decreases their toughness. Thus, for example, their tensile impact strength is markedly reduced, and their bending strength, modulus of bending and recovery ratio after bending are also reduced. As a result, when the products are bent, breaking tends to occur.

Some methods for preventing crazing of aromatic copolyesters are known. For example, a method involving mixing and melting polyethylene terephthalate with the aromatic copolyester (e.g., as described in U.S. Pat. No. 3,946,091), a method comprising mixing and melting polyethylene hydroxybenzoate with the aromatic copolyester (e.g., as described in U.S. Pat. No. 3,884,990), a method involving mixing and melting polybutylene terephthalate with the aromatic copolyester (e.g., as described in Japanese Patent Application (OPI) No. 34342/75), and a method comprising mixing and melting an organic phosphite ester with the aromatic copolyester (e.g., as described in Japanese Patent Application (OPI) No. 16558/72), are known attempts to prevent crazing. All of these methods, however, reduce the inherent fire retardancy of aromatic copolyesters, and also tend to decrease the high heat distortion temperatures and thermal stability of aromatic copolyesters. Other improvements have therefore been desired.

Frequently, aromatic copolyesters are used at high temperatures to take advantage of their high heat distortion temperatures. However, the heat stability of aromatic copolyesters at high temperatures is not entirely satisfactory, and an improvement in the heat stability has been desired.

Melt-mixing of a phosphite ester with aromatic copolyesters (e.g., as described in Japanese Patent Application (OPI) No. 16558/72), and the addition of an epoxy compound to aromatic copolyesters are known examples of methods for improving the thermal stability of aromatic copolyesters. However, these methods cause a reduction in the fire retardancy of the copolyesters, and better methods are desired.

SUMMARY OF THE INVENTION

A first object of this invention is to improve the crazing resistance of molded products of aromatic copolyesters.

Another object of this invention is to improve the thermal stability of aromatic copolyesters.

A further object of this invention is to provide aromatic copolyesters having improved thermal stability and crazing resistance which can be used for the production of various fabricated articles such as injection-molded articles, monofilaments and films.

These and other objects of the invention will become apparent from the following detailed description of the invention.

Investigations have been made in order to provide a method for improving the crazing resistance and thermal stability of aromatic copolyesters derived from terephthalic acid, isophthalic acid and a bisphenol without impairing the inherent superior fire retardancy, high heat distortion temperatures and transparency of aromatiuc copolyesters. The investigations led to the discovery that the above-described objects can be achieved by adding a specified metal salt of an organic carboxylic acid to an aromatic copolyester composition.

According to the invention, there is provided an aromatic copolyester composition comprising:

(A) an aromatic copolyester derived from (a) a mixture of terephthalic acid and/or a functional derivative thereof and isophthalic acid and/or a functional derivative thereof, with the terephthalic acid unit/isophthalic acid unit mole ratio being about 9:1 to about 1:9; and (b) a bisphenol of the general formula (I)

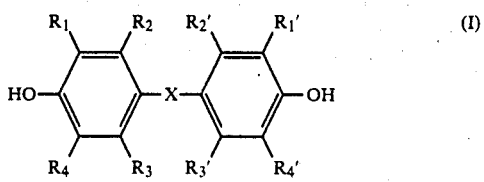

wherein —X— is a member selected from the group consisting of —O—, —S—, —SO$_2$—, —SO—, —CO—, an alkylene group containing 1 to 4 carbon atoms and an alkylidene group containing 1 to 4 carbon atoms, and $R_1$, $R_2$, $R_3$, $R_4$, $R'_1$, $R'_2$, $R'_3$ and $R'_4$ which may be the same or different each is a member selected from the group consisting of a hydrogen atom, a chlorine atom, a bromine atom and an alkyl group containing 1 to 4 carbon atoms, or a functional derivative thereof, and (B) a salt of an organic carboxylic acid containing 1 to 22 carbon atoms and a metal of Groups I, II, III or IV of the Periodic Table.

DETAILED DESCRIPTION OF THE INVENTION

Surprisingly, the crazing of molded articles prepared from the aromatic copolyester composition of this invention is markedly inhibited in boiling water or steam, and the thermal stability at high temperatures of such molded articles shows a marked improvement. Moreover, these molded articles retain quite well the good mechanical properties, fire retardancy and transparency which aromatic copolyesters inherently possess.

The aromatic copolyester used in this invention is obtained from a mixture of terephthalic acid and isopothalic acid and/or the functional derivatives thereof (the terephthalic acid unit/isophthalic acid unit mole ratio being about 9:1 to about 1:9) and a bisphenol of the following general formula (I)

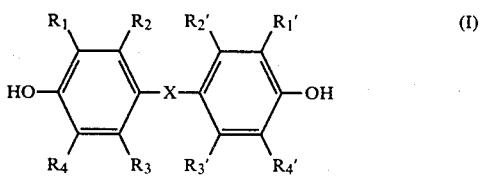

wherein —X— is selected from the group consisting of —O—, —S—, —SO$_2$—, —SO—, —CO—, an alkylene group containing 1 to 4 carbon atoms and an alkylidene group containing 1 to 4 carbon atoms, and $R_1$, $R_2$, $R_3$, $R_4$, $R'_1$, $R'_2$, $R'_3$ and $R'_4$, which may be the same or different, each is selected from the group consisting of a hydrogen atom, a chlorine atom, a bromine atom and an alkyl group containing 1 to 4 carbon atoms, or a functional derivative thereof.

A mixture of about 90 to about 10 mole % of terephthalic acid and/or a functional derivative thereof and about 10 to about 90 mole % of isophthalic acid and/or a functional derivative thereof is used as an acid component to be reacted with the bisphenol to prepare the aromatic copolyester as referred to in this invention. Preferably, a mixture of 30 to 70 mole % of terephthalic acid and/or a functional derivative thereof and 70 to 30 mole % of isophthalic acid and/or a functional derivative thereof is used. Aromatic copolyesters prepared from a bisphenol and a mixture of 50 mole % of terephthalic acid and/or a functional derivative thereof and 50 mole % of isophthalic acid and/or a functional derivative thereof is most preferred. The molar ratio of the bisphenol to the sum of the terephthalic acid units and isophthalic acid units is substantially equimolar.

Suitable functional derivatives of terephthalic or isophthalic acid include the acid halides, the dialkyl esters and the diaryl esters thereof. Preferred examples of acid halides include terephthaloyl dichloride, isophthaloyl dichloride, terephthaloyl dibromide and isophthaloyl dibromide. Preferred examples of dialkyl esters include dialkyl esters of these acids containing 1 to 6 (especially 1 to 2) carbon atoms in each alkyl moiety thereof. Preferred examples of diaryl esters include diphenyl terephthalate, diphenyl isophthalate.

Examples of suitable bisphenols of the above formula are 4,4'-dihydroxy-diphenyl ether, bis(4-hydroxy-2-methylphenyl) ether, bis(4-hydroxy-3-chlorophenyl) ether, bis(4-hydroxyphenyl) sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenol)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and 1,1-bis(4-hydroxyphenyl)-n-butane. 2,2-bis(4-Hydroxyphenyl)propane, bisphenol A, is most typical and is readily available, and accordingly, is most often used.

Typical examples of functional derivatives of bisphenols are the metal salts thereof and the diesters thereof with aliphatic monocarboxylic acids containing 1 to 3 carbon atoms. Preferred functional derivatives of bisphenols are the sodium salts, the potassium salts, and the diacetate esters thereof. The bisphenols may be used either alone or as a mixture of two or more thereof.

These aromatic copolyesters can be prepared, for example, using an interfacial polymerization method which comprises mixing an aromatic dicarboxylic acid chloride dissolved in a water-immiscible organic solvent with an alkaline aqueous solution of a bisphenol, a solution polymerization method which comprises heating a bisphenol and an aromatic dicarboxylic acid chloride in an organic solvent, or a melt polymerization method which comprises heating a phenyl ester of an aromatic dicarboxylic acid and a bisphenol, as described in detail in U.S. Pat. Nos. 3,884,990 and 3,946,091.

In order to insure good physical properties for the aromatic copolyesters used in this invention, they should have an inherent viscosity ($\eta_{inh}$), defined by the following equation, of about 0.3 to about 1.0, preferably 0.4 to 0.8.

$$\eta_{inh} = (\log_e t_1/t_2/C)$$

wherein $t_1$ is the falling tim (in seconds) of a solution of the polymer in a solvent; $t_2$ is the falling time (in seconds) of the solvent; and C is the concentration (in g/dl) of the polymer in the solution. The inherent viscosity, as used herein, is determined in a 1,1,2,2-tetrachloroethane/phenol mixture (weight ratio: 4/6) at 25° C.

The metal salt of an organic carboxylic acid used in the present invention is a salt formed between an organic carboxylic acid containing 1 to 22 carbon atoms and a metal of Groups I to IV of the Periodic Table. Suitable organic carboxylic acids which can be used in the present invention include aliphatic carboxylic acids, alicyclic carboxylic acids, aromatic carboxylic acids and the like. Suitable organic carboxylic acids further include monocarboxylic acids and polycarboxylic acids containing up to 4 carboxyl groups. Of these, monocarboxylic and dicarboxylic acids are preferred since they do not cause the composition to gel. Specific examples of aliphatic monocarboxylic acids are formic acid, acetic acid, propionic acid, butyric acid, pentanoic acid, hexanoic acid, heptanoic acid, octanoic acid, pelargonic acid, capric acid, lauric acid, myristic acid, palmitic acid and stearic acid. A specific example of an alicyclic monocarboxylic acid is cyclohexanecarboxylic acid. Specific examples of aromatic monocarboxylic acids are phenylacetic acid and benzoic acid, with formic acid, acetic acid, stearic acid, benzoic acid and lauric acid being preferred. Specific examples of aliphatic dicarboxylic acids are malonic acid, succinic acid, suberic acid, glutaric acid, adipic acid and azelaic acid, a specific example of an alicyclic dicarboxylic acid is cyclohexanedicarboxylic acid, and specific examples of aromatic dicarboxylic acids are terephthalic acid, isophthalic acid and naphthalenedicarboxylic acid with terephthalic acid and isophthalic acid being preferred. Trimellitic acid is an example of a tricarboxylic acid which can be used, and pyromellitic acid is an example of a tetracarboxylic acid which can be used. It should be specifically noted with respect to the carboxylic acid which can be used that the type of substituent(s) on the organic carboxylic acid, if such is/are present, is not important, and such can be freely selected without deleteriously altering the effect of the carboxylic acid.

In the organic acid salts used in this invention, all of the carboxyl groups may be in the form of a metal salt, or one or more of the carboxyl groups may remain as free carboxyl groups without forming a salt. Only one of the carboxyl groups needs to be in the form of a salt of a Group I to IV metal.

Suitable metals which form the metal salt of the organic carboxylic acid used in this invention are metals of Groups I to IV of the Periodic Table. Examples of preferred metals for use in this invention include alkali metals of Group I of the Periodic Table such as lithium, sodium and potassium, alkaline earth metals of Group II of the Periodic Table such as magnesium, calcium and barium, and other metals such as zinc, cadmium, tin and lead. Of these metals, alkali metals such as lithium, sodium and potassium are especially preferred because superior effects in preventing crazing of aromatic copolyesters and in improving the thermal stability are obtained when they are used. The metals of Groups II to IV of the Periodic Table show a superior effect in preventing crazing, but tend to be somewhat inferior in improving thermal stability. Metals other than those of Groups I to IV of the Periodic Table are not desirable since they have a low effect in preventing crazing and tend to cause a thermal decomposition of the polymer during melting. Hereinafter the metal salt of an organic carboxylic acid will be referred to as an organic acid salt for brevity.

A suitable amount of the organic acid salt incorporated in the aromatic copolyester is about 0.01 to about 3% by weight, especially 0.1 to 1.0% by weight, based on the aromatic copolyester so as to cause the resulting aromatic copolyester composition to exhibit the effects achieved by the present invention. Use of the organic acid salt in such small amounts can lead to a satisfactory improvement in crazing resistance and thermal stability. The effect of the organic acid salt to prevent crazing and improve thermal stability is not proportional to the amount of the organic acid salt. If the amount of the organic acid salt exceeds about 3% by weight, coloration and decomposition of the aromatic copolyester composition frequently occurs or a reduction in transparency during fabrication of the aromatic copolyester composition occurs. The intended effects, on the other hand, cannot be achieved where too small an amount of the organic acid salt is used.

The organic acid salts may be used individually or as mixtures thereof in this invention.

In an attempt to achieve a synergistic effect in improving thermal stability, if the organic acid salt is used in admixture with a phophite ester or an ortho-phosphate ester, gellation of the aromatic copolyester will occur during melt-extrusion. This not only makes melt-extrusion difficult, but also causes disadvantageous phenomena such as a reduction in the impact strength of the molded articles.

Any well known mixing techniques can be used to add the organic carboxylic acid metal salt to the aromatic copolyester. It is merely required that these additives be substantially uniformly admixed with the aromatic copolyester. For example, granules or powders of these components can be mixed and blended using a V-blender, Henschel mixer, Supermixer or Kneader, and then the mixture immediately molded. Alternatively, the mixture can be formed into pellets after melting by an extruder, a Ko-kneader (manufactured by Buss Co., Ltd., Switzerland), an intensive mixer or the like, and then molded. The pelletizing or molding temperature is generally about 250° C. to about 350° C., preferably 260° to 320° C.

Another method of addition comprises adding the organic carboxylic acid metal salt to a solution of the aromatic copolyester and then evaporating off the solvent. The solvent used for this purpose may be those which dissolve the aromatic copolyester, such as methylene dichloride, tetrachloroethane and chloroform. Methylene dichloride is most preferred.

The optimal method for any particular system is chosen depending on the composition and the desired shape and properties of the molded articles to be produced therefrom.

A weather resisting agent or an antioxidant may also be incorporated in the composition of this invention comprising the aromatic copolyester and the organic salt. Benzotriazole compounds, benzophenone compounds and phenolic compounds can be used for this purpose. Representative examples of antioxidants which can be used in the present invention include phenol compounds such as 2,6-di-tert-butyl-4-methylphenol, 2,4,6-tri-tert-butylphenol, etc. Plasticizers, pigments and lubricants may also be added, or the composition may be reinforced with glass fibers.

If desired, the aromatic copolyester composition of this invention may further contain at least one polymer such as a polyalkylene terephthalate (e.g., polyethylene terephthalate or polybutylene terephthalate), polyethylene hydroxybenzoate, a polycarbonate, polyethylene, polypropylene, a polyamide, a polyurethane, polystyrene, an ABS resin, an ethylene/vinyl acetate copolymer, a poly(acrylate ester), polytetrafluoroethylene, polymethyl methacrylate, and polyphenylene sulfide rubber depending on the particular end-use purpose.

Such additives can be added in an amount which does not markedly deteriorate the properties of the aromatic copolyester compositions according to the present invention. The amount added thereof will vary depending upon the type of additives, but generally the amount thereof ranges from about 1 to about 10% by weight based on the weight of the aromatic copolyester composition.

The aromatic copolyester compositions of this invention can be used to produce many useful articles employing generally known molding methods such as injection molding, extrusion molding or press molding. Typical examples of final products which can be obtained by molding are films, monofilaments, and injection-molded articles such as machine parts, automobile parts, electrical component parts, receptacles and springs. The aromatic copolyester compositions of this invention also are particularly useful as engineering plastics for various applications which require their excellent properties. The occurrence of crazing in these molded articles upon exposure to hot water or steam for long periods of time is markedly prevented, and the reduction of molecular weight or mechanical strength upon such exposure is also decreased to a slight degree. Furthermore, the molded articles retain the inherent transparency of the aromatic copolyesters, and have good durability at high temperatures.

The following examples are given to illustrate the present invention more specifically. In these examples, crazing and thermal stability were evaluated by the following methods and the inherent viscosities are values measured at 25° C. using a mixture of phenol and tetrachloroethane (6/4 weight ratio) (C=1 g/dl). Further, in these examples, all parts, percents, ratios and the like are by weight.

CRAZING TREATMENT AND METHOD OF MEASUREMENT

A ⅛ inch thick tensile impact test piece was allowed to stand for 24 hours in boiling water, and then was removed. The condition of occurrence of crazing in the test piece was visually evaluated, and the tensile impact strength (ASTM-D-1822) of the test piece was measured to determine the reduction in the strength of the test piece.

METHOD FOR TREATMENT TO EVALUATE THERMAL STABILITY AND METHOD OF MEASUREMENT

A ⅛ inch thick tensile impact test piece was allowed to stand for 10 days in a hot air oven at 170° C., and then the tensile impact strength of the test piece (ASTM-D-1822) and the inherent viscosity of the polymer were measured. The inherent viscosity was measured at 25° C. for a solution of the polymer at a concentration of 1.0 g/dl in a 6:4 (by weight) mixture of phenol and tetrachloroethane. Since the inherent viscosity is correlated with the average degree of polymerization of the polymer, the inherent viscosity of the heat-treated polymer becomes a measure of the thermal decomposition.

The fire retardancy of the composition was evaluated using the method of Underwriters Laboratory Subject 94 using a 1/16 inch thick molded article.

EXAMPLES 1 to 61

Terephthaloyl dichloride (2.03 kg) and 2.03 kg of isophthaloyl dichloride were dissolved in 50 liters of methylene chloride, and the temperature of the solution was adjusted to 20° C. Separately, 4.56 kg of 2,2-bis(4-hydroxyphenyl)propane, 1.68 kg of sodium hydroxide, 60 g of p-tert-butyl phenol and 23 g of trimethyl benzyl ammonium chloride were dissolved in 100 liters of water, and the temperature of the solution was adjusted to 20° C. The two solutions were placed in a 200-liter reaction tank equipped with a homomixer, and were stirred vigorously for 5 hours at 20° C. The stirring was then stopped, and the methylene chloride layer was separated and washed with deionized water until the washing water became neutral. Then, an equal amount by volume of acetone was added, and the mixture was dried with hot air at 100° C. to obtain a flaky polymer having an inherent viscosity of 0.65.

Each of the various metal salts of the organic carboxylic acids shown in Table 1 below was dissolved in or suspended in a 1:1 (by volume) mixture of acetone and water in a concentration of 10 g/liter. The resulting solution or suspension was mixed in the amounts shown in Table 1 below, with the flaky polymer produced as described above. The mixture was dried for 1 hour with hot air at 120° C., and then dried in vacuo for 5 hours at 120° C. and 20 torr. The product was formed into chips using a monoaxial-screw extruder (screw diameter: 50 mm) having a cylinder temperature of 310° C. The chips were molded using a 1-ounce injection-molding machine to form test pieces for tensile impact strength testing and 1/16 inch test piece for five retardancy testing. The injection molding conditions used were as follows: injection pressure: 1200 kg/cm², cylinder temperature: 330° C.; die temperature: 120° C.

The molded articles were subjected to the crazing treatment, and changes in the tensile impact strength and appearance before and after the crazing treatment were evaluated. Furthermore, the test pieces were subjected to the thermal stability evaluation treatment, and the tensile impact strength and inherent viscosity of the test pieces were measured. The fire retardancy of each of the untreated 1/16 inch burning test pieces was also examined. The results obtained are shown in Table 1 below.

The tensile impact strength unit is kg-cm/cm². The amounts (% by weight) of the additives were based on the amount of the aromatic copolyester.

TABLE 1

| Example | Additive Type | Amount (wt %) | Before Treatment Inherent Viscosity | Before Treatment Tensile Impact Strength | Before Treatment Degree of Crazing | Combustibility | After Crazing Treatment Degree of Crazing | After Crazing Treatment Tensile Impact Strength | After Heat-Treatment Inherent Viscosity | After Heat-Treatment Tensile Impact Strength |
|---|---|---|---|---|---|---|---|---|---|---|
| 1* | None | 0 | 0.61 | 283 | None | V-1 | Marked | 62 | 0.52 | 205 |
| 2 | Sodium Acetate | 0.02 | 0.61 | 290 | " | V-1 | Slight | 121 | 0.58 | 261 |
| 3 | " | 0.2 | 0.61 | 285 | " | V-1 | None | 264 | 0.58 | 255 |
| 4 | " | 1.0 | 0.60 | 270 | " | V-1 | " | 255 | 0.56 | 243 |
| 5 | " | 3.0 | 0.56 | 235 | " | V-1 | " | 180 | 0.54 | 230 |
| 6 | Calcium Acetate | 0.02 | 0.61 | 275 | " | V-1 | Slight | 169 | 0.58 | 260 |

TABLE 1-continued

| | Additive | | Before Treatment | | | After Crazing Treatment | | After Heat-Treatment | |
|---|---|---|---|---|---|---|---|---|---|
| Example | Type | Amount (wt %) | Inherent Viscosity | Tensile Impact Strength | Degree of Crazing | Combustibility | Degree of Crazing | Tensile Impact Strength | Inherent Viscosity | Tensile Impact Strength |
| 7 | " | 0.2 | 0.61 | 284 | " | V-1 | None | 255 | 0.59 | 265 |
| 8 | " | 1.0 | 0.60 | 270 | " | V-1 | " | 230 | 0.55 | 235 |
| 9 | " | 3.0 | 0.55 | 254 | " | V-1 | " | 211 | 0.53 | 220 |
| 10 | Magnesium Acetate | 0.02 | 0.61 | 287 | " | V-1 | Slight | 157 | 0.57 | 252 |
| 11 | " | 0.2 | 0.61 | 275 | " | V-1 | None | 226 | 0.59 | 271 |
| 12 | " | 1.0 | 0.60 | 262 | " | V-1 | " | 215 | 0.56 | 247 |
| 13 | " | 3.0 | 0.56 | 230 | " | V-1 | " | 202 | 0.53 | 217 |
| 14 | Zinc Acetate | 0.02 | 0.61 | 281 | " | V-1 | Slight | 145 | 0.57 | 251 |
| 15 | Zinc Acetate | 0.02 | 0.58 | 280 | None | V-1 | None | 181 | 0.56 | 244 |
| 16 | " | 1.0 | 0.56 | 235 | " | V-1 | " | 246 | 0.53 | 220 |
| 17 | " | 3.0 | 0.53 | 217 | " | V-1 | " | 197 | 0.52 | 205 |
| 18 | Sodium Stearate | 0.02 | 0.61 | 290 | " | V-1 | Slight | 159 | 0.57 | 244 |
| 19 | " | 0.2 | 0.61 | 305 | " | V-1 | None | 256 | 0.59 | 265 |
| 20 | " | 1.0 | 0.60 | 287 | " | V-1 | " | 230 | 0.57 | 248 |
| 21 | " | 3.0 | 0.56 | 220 | " | V-1 | " | 188 | 0.55 | 240 |
| 22 | Calcium Stearate | 0.02 | 0.61 | 302 | " | V-1 | Slight | 202 | 0.57 | 253 |
| 23 | " | 0.2 | 0.61 | 314 | " | V-1 | None | 293 | 0.59 | 267 |
| 24 | " | 1.0 | 0.61 | 310 | " | V-1 | " | 287 | 0.56 | 245 |
| 25 | " | 3.0 | 0.55 | 285 | " | V-1 | " | 150 | 0.53 | 215 |
| 26 | Magnesium Stearate | 0.02 | 0.61 | 280 | " | V-1 | Slight | 180 | 0.56 | 240 |
| 27 | " | 0.2 | 0.61 | 302 | " | V-1 | None | 270 | 0.58 | 249 |
| 28 | " | 2.0 | 0.58 | 255 | " | V-1 | " | 225 | 0.55 | 238 |
| 29 | Barium Stearate | 0.02 | 0.61 | 293 | None | V-1 | Slight | 185 | 0.56 | 251 |
| 30 | " | 0.2 | 0.61 | 310 | " | V-1 | None | 254 | 0.58 | 263 |
| 31 | " | 2.0 | 0.58 | 262 | " | V-1 | " | 215 | 0.54 | 227 |
| 32 | Zinc Stearate | 0.02 | 0.61 | 287 | " | V-1 | Slight | 200 | 0.57 | 250 |
| 33 | " | 0.2 | 0.55 | 240 | " | V-1 | None | 272 | 0.54 | 231 |
| 34 | " | 2.0 | 0.54 | 231 | " | V-1 | " | 220 | 0.52 | 210 |
| 35 | Sodium Laurate | 0.02 | 0.61 | 288 | " | V-1 | Slight | 195 | 0.57 | 246 |
| 36 | " | 0.2 | 0.61 | 280 | " | V-1 | None | 260 | 0.57 | 251 |
| 37 | " | 2.0 | 0.58 | 253 | " | V-1 | " | 208 | 0.54 | 235 |
| 38 | Calcium Laurate | 0.02 | 0.61 | 290 | " | V-1 | Slight | 175 | 0.56 | 242 |
| 39 | " | 0.2 | 0.61 | 285 | " | V-1 | None | 254 | 0.58 | 265 |
| 40 | " | 2.0 | 0.57 | 250 | " | V-1 | " | 236 | 0.53 | 222 |
| 41 | Barium Laurate | 0.02 | 0.61 | 290 | " | V-1 | Slight | 180 | 0.57 | 249 |
| 42 | " | 0.2 | 0.61 | 285 | " | V-1 | None | 266 | 0.58 | 260 |
| 43 | Barium Laurate | 2.0 | 0.57 | 255 | None | V-1 | None | 209 | 0.53 | 215 |
| 44 | Sodium Benzoate | 0.02 | 0.61 | 293 | " | V-1 | Slight | 165 | 0.57 | 250 |
| 45 | " | 0.2 | 0.61 | 300 | " | V-1 | None | 281 | 0.57 | 250 |
| 46 | " | 2.0 | 0.56 | 254 | " | V-1 | " | 213 | 0.53 | 220 |
| 47 | Calcium Benzoate | 0.02 | 0.61 | 275 | " | V-1 | Slight | 187 | 0.56 | 249 |
| 48 | " | 0.2 | 0.61 | 308 | " | V-1 | None | 271 | 0.57 | 250 |
| 49 | " | 2.0 | 0.58 | 258 | " | V-1 | " | 207 | 0.53 | 215 |
| 50 | Sodium Terephthalate | 0.02 | 0.61 | 280 | " | V-1 | Slight | 158 | 0.56 | 245 |
| 51 | " | 0.2 | 0.60 | 290 | " | V-1 | None | 237 | 0.58 | 262 |
| 52 | " | 2.0 | 0.57 | 247 | " | V-1 | " | 195 | 0.54 | 232 |
| 53 | Sodium Trimellitate | 0.02 | 0.61 | 286 | " | V-1 | Slight | 188 | 0.57 | 251 |
| 54 | " | 0.2 | 0.61 | 276 | " | V-1 | None | 251 | 0.57 | 247 |
| 55 | " | 2.0 | 0.54 | 230 | " | V-1 | " | 187 | 0.53 | 220 |
| 56 | Sodium Pyromellitate | 0.02 | 0.61 | 287 | " | V-1 | Slight | 172 | 0.56 | 246 |
| 57 | Sodium Pyromellitate | 0.2 | 0.60 | 254 | None | V-1 | None | 220 | 0.57 | 251 |
| 58 | " | 2.0 | 0.57 | 243 | " | V-1 | " | 175 | 0.53 | 215 |
| 59 | Sodium Formate | 0.02 | 0.61 | 288 | " | V-1 | " | 165 | 0.58 | 240 |
| 60 | " | 0.2 | 0.60 | 265 | " | V-1 | " | 240 | 0.57 | 225 |
| 61 | " | 2.0 | 0.57 | 230 | " | V-1 | " | 218 | 0.58 | 210 |

*Example 1 is a control example.

The results shown in Table 1 above demonstrate that when the aromatic copolyester does not contain the specified additive as used in this invention (Example 1), crazing occurs to a high degree on treatment with boiling water. In contrast, the aromatic copolyester compositions of this invention have reduced occurrence of crazing due to the addition of the organic carboxylic acid metal salts, and show an improvement in thermal stability with little reduction in inherent viscosity and tensile impact strength upon heat treatment. It is noted, however, that if the amount of the organic carboxylic acid metal salt is small, the effect of preventing crazing decreases, and if the amount of the organic carboxylic acid metal salt is large, the effect of improving thermal stability decreases.

EXAMPLES 62 TO 79

Terephthaloyl dichloride (1.22 kg), and 0.812 kg of isophthaloyl dichloride were dissolved in 25 liters of methylene chloride, and the temperature of the solution was adjusted to 20° C. Separately, 2.28 kg of 2,2-bis(4-hydroxyphenyl)propane, 0.848 kg of sodium hydroxide, 35 g of p-phenyl phenol and 13 g of trimethyl benzyl ammonium chloride were dissolved in 50 liters of water, and the temperature was adjusted to 20° C. The two solutions were placed in a 150-liter reaction tank equipped with a stirrer, and were vigorously stirred for 5 hours at 20° C. The stirring was then stopped, and the methylene chloride layer was separated, followed by washing with deionized water until the washing water became neutral. Then, an equal amount by volume of acetone was added, and the mixture was dried with hot air at 100° C. to obtain a flaky polymer having an inherent viscosity of 0.71.

Each of the various organic carboxylic acid metal salts shown in Table 2 below was dissolved in or suspended in a 1:1 (by volume) mixture of acetone and water in a concentration of 10 g/liter. The solution or suspension was mixed in the amounts indicated in Table 2 below with the flaky polymer produced as described above. The mixture was dried for 1 hour with hot air at 120° C. and then dried in vacuo for 5 hours at 120° C. and 20 torr. The dried product was formed into chips using a monoaxial-screw extruder (screw diameter: 50 mm) having a cylinder temperature of 310° C. The chips were then molded using a 1-ounce injection-molding machine to prepare test pieces for tensile impact strength testing and 1/16 inch test pieces for fire retardancy testing. The injection molding conditions used were as follows: injection pressure: 1200 kg/cm$^2$; cylinder temperature: 330° C.; die temperature: 120° C.

The molded articles were subjected to the crazing treatment, and the changes in the tensile impact strength and appearance of the test pieces before and after the crazing treatment were evaluated. Furthermore, the test pieces were subjected to the thermal stability evaluation treatment, and the tensile impact strength and inherent viscosity of each of the test pieces were measured. The fire retardancy of each of the untreated 1/16 inch burning test pieces was also evaluated. The results obtained are shown in Table 2 below.

1. An aromatic copolyester composition comprising:
(A) an aromatic copolyester prepared by reacting
(a) a mixture of terephthalic acid and/or a functional derivative thereof and isophthalic acid and/or a functional derivative thereof, with the terephthalic acid unit/isophthalic acid unit molar ratio being about 9:1 to about 1:9, and
(b) a bisphenol of the general formula (I)

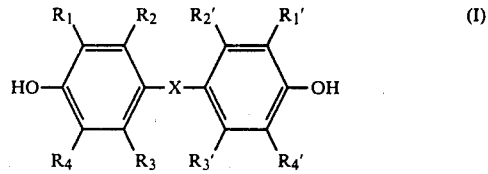

wherein —X— is a member selected from the group consisting of —O—, —S—, —SO$_2$—, —SO—, —CO—, an alkylene group containing 1 to 4 carbon atoms and an alkylidene group containing 1 to 4 carbon atoms, and $R_1$, $R_2$, $R_3$, $R_4$, $R'_1$, $R'_2$, $R'_3$ and $R'_4$, which may be the same or different, each is a member selected from the group consisting of a hydrogen atom, a chlorine atom, a bromine atom and an alkyl group containing 1 to 4 carbon atoms, or a functional derivative thereof, and
(B) a salt of an organic carboxylic acid containing 1 to 22 carbon atoms and a metal of Groups I, II, III or IV of the Periodic Table.

TABLE 2

| Example | Additive Type | Additive Amount (wt %) | Before Treatment Inherent Viscosity | Before Treatment Tensile Impact Strength | Before Treatment Degree of Crazing | Before Treatment Combustibility | After Crazing Treatment Degree of Crazing | After Crazing Treatment Tensile Impact Strength | After Heat-Treatment Inherent Viscosity | After Heat-Treatment Tensile Impact Strength |
|---|---|---|---|---|---|---|---|---|---|---|
| 62* | None | 0 | 0.62 | 275 | None | V-1 | Marked | 48 | 0.53 | 220 |
| 63 | Sodium Acetate | 0.02 | 0.62 | 283 | " | V-1 | Slight | 118 | 0.59 | 265 |
| 64 | " | 0.2 | 0.62 | 278 | " | V-1 | None | 235 | 0.59 | 260 |
| 65 | " | 1.0 | 0.61 | 270 | " | V-1 | " | 240 | 0.57 | 253 |
| 66 | " | 3.0 | 0.56 | 245 | " | V-1 | " | 183 | 0.54 | 231 |
| 67 | Calcium Acetate | 0.02 | 0.62 | 265 | " | V-1 | Slight | 140 | 0.59 | 255 |
| 68 | " | 0.2 | 0.62 | 282 | " | V-1 | None | 198 | 0.60 | 260 |
| 69 | " | 1.0 | 0.60 | 270 | " | V-1 | " | 231 | 0.55 | 243 |
| 70 | " | 3.0 | 0.55 | 246 | " | V-1 | " | 136 | 0.53 | 215 |
| 71 | Sodium Stearate | 0.02 | 0.62 | 294 | " | V-1 | Slight | 122 | 0.58 | 244 |
| 72 | " | 0.2 | 0.62 | 273 | " | V-1 | None | 235 | 0.60 | 260 |
| 73 | " | 1.0 | 0.60 | 271 | " | V-1 | " | 222 | 0.57 | 245 |
| 74 | " | 3.0 | 0.56 | 240 | " | V-1 | " | 195 | 0.55 | 230 |
| 75 | Sodium Benzoate | 0.02 | 0.62 | 280 | " | V-1 | Slight | 125 | 0.57 | 250 |
| 76 | Sodium Benzoate | 0.2 | 0.62 | 277 | None | V-1 | None | 245 | 0.57 | 246 |
| 77 | " | 1.0 | 0.60 | 265 | " | V-1 | " | 207 | 0.54 | 231 |
| 78 | Sodium Terephthalate | 0.2 | 0.62 | 275 | " | V-1 | " | 248 | 0.56 | 248 |
| 79 | " | 1.0 | 0.60 | 264 | " | V-1 | " | 210 | 0.57 | 240 |

*Example 62 is a control example.

The effect of adding the organic carboxylic acid metal salts is clearly demonstrated in comparison with the case where the salt was not added. When the amounts of the organic carboxylic acid metal salts are outside the range specified above, no effect in preventing crazing is obtained or the improvement of thermal decomposition resistance is small.

The tensile impact strength units were kg-cm/cm$^2$.

While the invention has been described in detail and with reference to specific embodiments thereof, it will be apparent to one skilled in the art that various changes and modifications can be made therein without departing from the spirit and scope thereof.

What is claimed is:

2. The composition of claim 1, wherein the biphenol is 2,2-bis(4-hydroxyphenyl)propane.

3. The composition of claim 1, wherein the molar ratio of the terephthalic acid units to the isophthalic acid unit i 7:3 to 3:7.

4. The composition of claim 1, wherein the molar ratio of the terephthalic acid units to the isophthalic acid unit is 1:1.

5. The composition of claim 1, wherein the amount of the organic carboxylic acid metal salt (B) is about 0.01 to about 3.0% by weight based on the weight of the aromatic copolyester (A).

6. The composition of claim 1, wherein the amount of the organic carboxylic acid metal salt (B) is 0.1 to 1.0% by weight based on the weight of the aromatic copolyester (A).

7. The composition of claim 1, wherein the organic carboxylic acid is a monocarboxylic acid.

8. The compoition of claim 7, wherein the monocarboxylic acid is selected from the group conisting of formic acid, acetic acid, stearic acid, benzoic acid an lauric acid.

9. The composition of claim 1, wherein the organic carboxylic acid is a dicarboxylic acid.

10. The composition of claim 9, wherein the dicarboxylic acid is selected from the group consisting of terephthalic acid and isophthalic acid.

11. The composition of claim 1, wherein the metal is an alkali metal.

12. The composition of claim 11, wherein the alkali metal is selected from the group consisting of lithium, sodium and potassium.

13. The composition of claim 1, wherein the metal is selected from the group consisting of magnesium, calcium, barium, zinc, cadmium, tin and lead.

14. The composition of claim 1, wherein the molar ratio of the terephthalic acid unit to the isophthalic acid units is 7:3 to 3:7, the bisphenol is 2,2-bis(4-hydroxyphenyl)propane, and the salt of the organic carboxylic acid is sodium acetate.

15. The composition of claim 1, wherein the molar ratio of the terephthalic acid units to the isophthalic acid units is 7:3 to 3:7, the bisphenol is 2,2-bis(4-hydroxyphenyl)propane, and the salt of the organic carboxylic acid is sodium stearate.

16. The composition of claim 1, wherein the molar ratio of the terephthalic acid units to the isophthalic acid units is 7:3 to 3:7, the bisphenol is 2,2-bis(4-hydroxyphenyl)propane, and the salt of the organic carboxylic acid is sodium formate.

17. The composition of claim 1, wherein the molar ratio of the terephthalic acid units to the isophthalic acid units is 7:3 to 3:7, the bisphenol is 2,2-bis(4-hydroxyphenyl)propane, and the salt of the organic carboxylic acid is sodium benzoate.

18. A molded article produced from the composition of claim 1.

19. A molded article produced for the composition of claim 14.

20. A molded article produced from the composition of claim 15.

21. A molded article produced from the composition of claim 16.

22. A moled article produced from the composition of claim 17.

* * * * *